J. HERMAN.
WATER COOLED BEARING.
APPLICATION FILED JULY 22, 1920.

1,424,097.

Patented July 25, 1922.

INVENTOR.
John Herman.
BY
Hazard & Miller
ATTORNEYS

UNITED STATES PATENT OFFICE.

JOHN HERMAN, OF LOS ANGELES, CALIFORNIA.

WATER-COOLED BEARING.

1,424,097. Specification of Letters Patent. Patented July 25, 1922.

Application filed July 22, 1920. Serial No. 398,166.

*To all whom it may concern:*

Be it known that I, JOHN HERMAN, a citizen of the United States, residing at Los Angeles, in the county of Los Angeles and State of California, have invented new and useful Improvements in Water-Cooled Bearings, of which the following is a specification.

This invention relates to water cooled bearings, and has for its object the provision of improved means for circulating the cooling water.

The invention will be readily understood from the following description of the accompanying drawings, in which—

Figure 1:
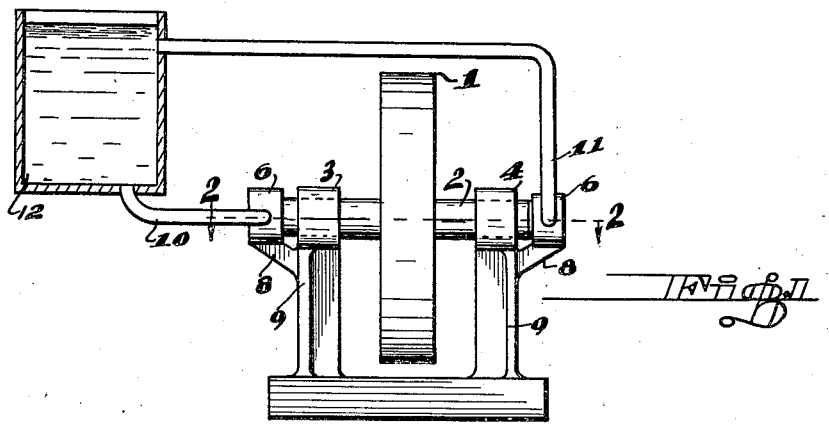
Figure 1 is a side elevation of a practical embodiment of the invention.

It will be obvious that the bearing provided with the improved water cooling means may be employed in any well known or preferred bearing construction, and for the purpose of illustration I have shown the improved bearing employed in connection with a flywheel 1 fixed upon a shaft 2, which is journaled in the bearings 3 and 4.

The shaft 2 is hollow to permit of the circulation of the cooling medium, and nipples 5 are threaded into the respective ends of the hollow shaft.

Chambers 6 surround the respective nipples in spaced relation therefrom, said chambers having stuffing means 7 at their open ends received around nipples 5 to provide leak-proof joints. The chambers 6 may be supported by arms 8 extending from the supporting means 9 for bearings 3 and 4.

Pipes 10 and 11 communicate with the chambers 6 at the respective ends of shaft 2, preferably, at the sides of said chambers, and said pipes communicate with a supply tank 12 adjacent the top and bottom thereof respectively. The cooling fluid contained within tank 12 is supplied through the pipe leading from the bottom of said tank, say the pipe 10, to one of the chambers 6 and thence through the nipple 5 in said chamber, which is provided with an open end to the hollow shell 2. The cooling liquid, which will thus cool bearings 3 and 4 is discharged through the nipple 5 in the chamber 6 at the opposite end of shaft 2 and thence through pipe 11, back to the upper portion of tank 12. The cooling liquid at the discharge end of shaft 2 will have become heated so that the liquid will readily rise in pipe 11, so as to be discharged into the top of tank 12 with the result that the cold liquid in said tank will flow downwardly and out through the supply pipe 10. A thermosiphon circulation of the cooling fluid is thus provided.

Figure 2:
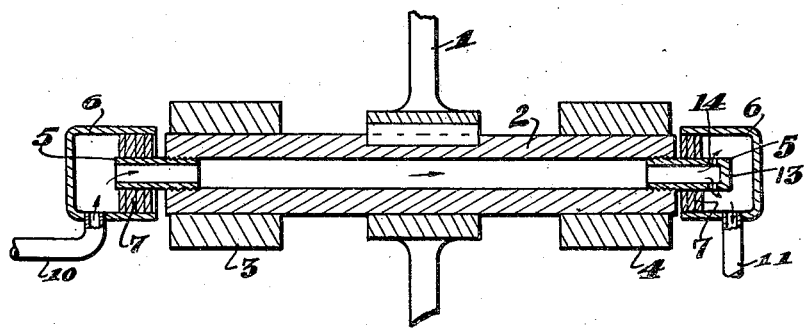
Fig. 2 is a longitudinal section on the line 2—2 of Fig. 1.
Figure 3:
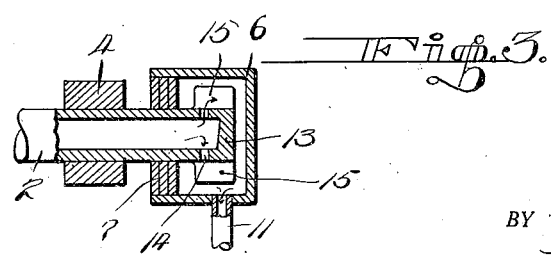
Figure 3 is a detail sectional view illustrating a modified form of the means utilized for effecting a circulation of cooling fluid through a hollow shaft.

In addition to the circulating means thus afforded, the cooling fluid discharged from shaft 2 may be caused to circulate by a construction such as is illustrated in Figure 3, such construction being in the form of blades 15 fixed for rotation with shaft 2, so as to pump the cooling fluid out through pipe 11, or said circulating means may be of the form illustrated in Fig. 2, in which the nipple 5 at the discharge end of shaft 2 is provided with a closed outer end 13 and with lateral apertures 14 in said nipple. By this arrangement the fluid discharged from the nipple will be thrown outwardly by the centrifugal force of the rotating shaft and will thus be caused to flow upwardly through pipe 11.

It will be apparent that various changes may be made in the construction as thus described without departing from the spirit of the invention.

What is claimed is:

1. The combination with a rotatable member, including a hollow shaft, chambers surrounding the ends of said shaft, blades positioned on one end of said shaft and within said chamber and actuated by the rotation of said shaft.

2. The combination with a rotatable member, of means for circulating a cooling fluid through said rotatable member, said circulating means including a thermosiphon circulation of said fluid, and also means for pumping said liquid actuated by the rotation of said member.

In testimony whereof I have signed my name to this specification.

JOHN HERMAN.